United States Patent [19]
Collins, Jr.

[11] Patent Number: 4,839,121
[45] Date of Patent: Jun. 13, 1989

[54] HIGH DENSITY TAPE CASTING SYSTEM

[75] Inventor: Earl R. Collins, Jr., La Canada, Calif.

[73] Assignee: The United States of America as represented by the Administrator of the National Aeronautics and Space Administration, Washington, D.C.

[21] Appl. No.: 921,574

[22] Filed: Oct. 21, 1986

[51] Int. Cl.[4] .................. B28B 1/20; B29C 67/00
[52] U.S. Cl. .................. 264/114; 264/311; 425/75; 425/425; 425/435; 425/73
[58] Field of Search .................. 264/114, 311, 113; 425/75, 73, 435, 425, 429

[56] References Cited

U.S. PATENT DOCUMENTS

| | | | |
|---|---|---|---|
| 2,346,784 | 4/1944 | Pollack | 18/26 |
| 3,714,312 | 1/1973 | Nitta et al. | 264/108 |
| 3,870,775 | 3/1975 | Castro et al. | 264/53 |
| 4,117,051 | 9/1978 | Ishikawa et al. | 264/29.1 |
| 4,378,953 | 4/1983 | Winn | 350/171 |
| 4,394,340 | 7/1983 | Tarumi et al. | 264/219 |
| 4,536,240 | 8/1985 | Winn | 156/74 |

FOREIGN PATENT DOCUMENTS 60-186454  9/1985  Japan .................. 264/311

Primary Examiner—Jan H. Silbaugh
Assistant Examiner—Mary Lynn Fertig
Attorney, Agent, or Firm—Thomas H. Jones; Paul F. McCaul; John R. Manning

[57] ABSTRACT

A system is provided for molding a slurry containing particles in a solution of solvent and binder, which enables the close control of the production of a tape with particles of a high density. A rotor forms a chamber with a cylindrical molding surface, and a conduit carries the slurry from the outside to the surface while the molding surface rotates to use centrifugal force to force particles against the molding surface. The chamber is substantially closed to avoid the uncontrolled loss of solvent, and a means is provided for venting the chamber to remove solvent therefrom after the slurry has been molded into a tape. A container lies within the chamber and holds solvent prior to casting the slurry, to create a solvent-containing environment within the chamber.

6 Claims, 1 Drawing Sheet

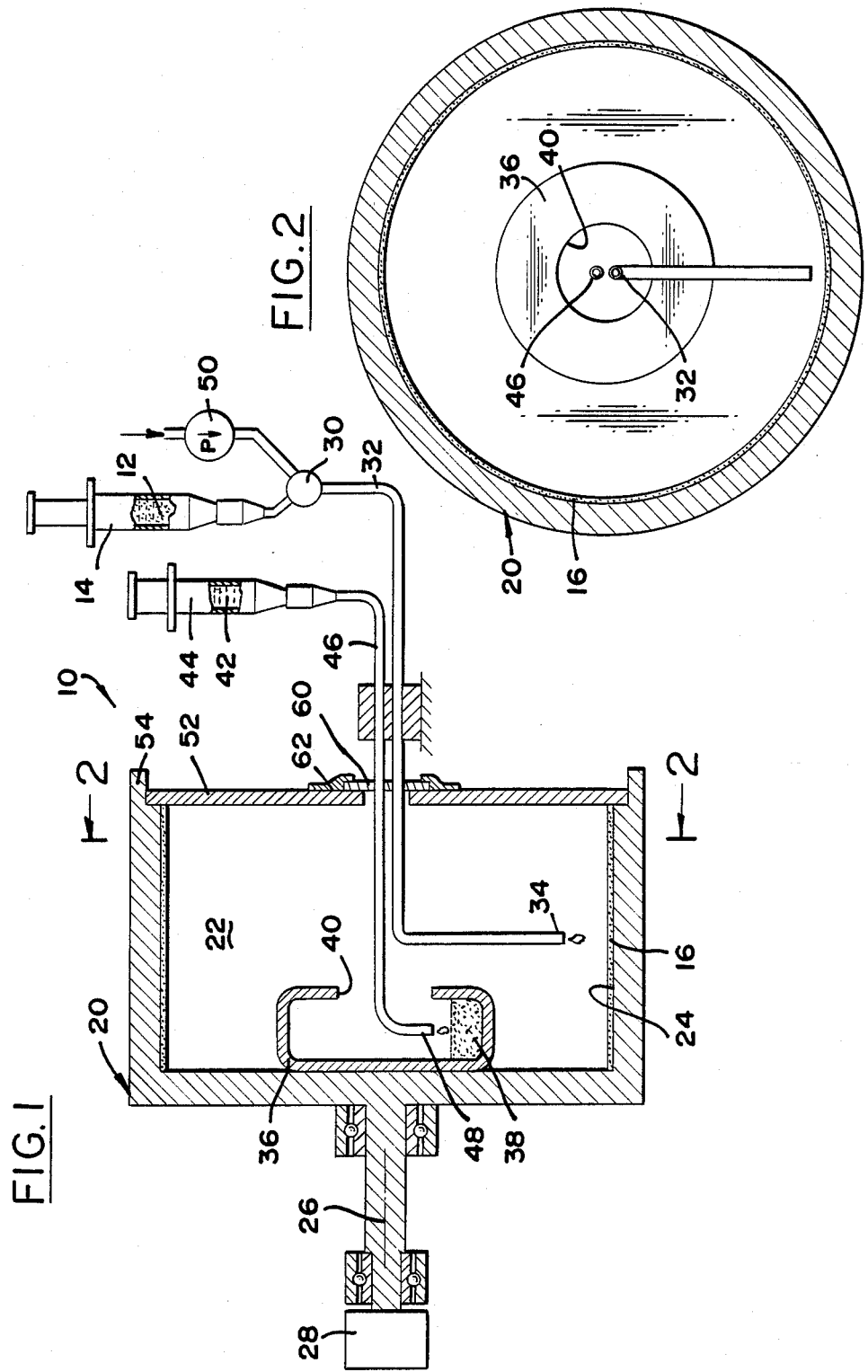

4,839,121

HIGH DENSITY TAPE CASTING SYSTEM

ORIGIN OF INVENTION

The invention described herein was made in the performance of work under a NASA contract, and is subject to the provisions of Public Law 96-517 (35 USC 202) in which the Contractor has elected not to retain title.

BACKGROUND OF THE INVENTION

Thin sheets, called tapes, that are used in manufacturing oxygen membranes, capacitors, etc., are formed by squeegeeing a slurry into a thin film, allowing the film to dry, and then baking it. The slurry includes solid particles, a binder that will hold the particles together, and a solvent that keeps the slurry highly fluid until the solvent evaporates. As the slurry dries, the binders coat the solid particles and hold them together. The density of the finished product depends upon the ability of the liquid components of the slurry to carry the solids and the uniformity of the spreading process. Variations in the thickness of the film, especialy as may be caused by evaporation of the solvent during the spreading process, cause variations in density and thickness of the cast tape, and it has been difficult to achieve a tightly packed mass of bound particles in the final tape. A method for casting a slurry to form a tape, which produced a uniform application of particles over the area of the tape, while achieving close to theoretical packing density of the particles, would be of considerable value.

SUMMARY OF THE INVENTION

In accordance with one embodiment of the present invention, a system is provided for molding a slurry containing particles in a solution, into a tape, which enables the uniform application of the particles in a high packing density. A chamber having a largely cylindrical internal molding surface is mounted for rapid rotation to create centrifugal forces. A conduit extending into the chamber applies slurry to the molding surface as it rapidly rotates. The chamber is substantially closed to avoid the rapid evaporation and loss of solvent as the slurry is applied, and until the slurry is evenly distributed on the molding surface and the particles are largely precipitated against the molding surface. A means is provided for then venting the chamber to remove the solvent so as to allow the binder to bind the particles, while the chamber continues to rotate.

A means is provided to fill the chamber with solvent vapors prior to the application of the slurry to the molding surface. This further assures that the slurry will remain highly fluid until it is well distributed on the molding surface and venting of solvent begins. The vapors can be provided by a solvent-holding container open to the chamber.

The novel features of the invention are set forth with particularity in the appended claims. The invention will be best understood from the following description when read in conjunction with the accompanying drawings.

BRIEF DESCRIPTION OF THE DRAWINGS:

FIG. 1 is a sectional view of a high density tape casting system constructed in accordance with the present invention.

FIG. 2 is a view taken on the line 2—2 of FIG. 1.

DESCRIPTION OF THE PREFERRED EMBODIMENTS:

FIG. 1 illustrates a tape casting system 10 which can mold a slurry 12 received from a source 14 into a tape 16. The system includes a rotor or housing 20 which forms a chamber 22 having an internal largely cylindrical molding surface 24. The housing 20 is rotatably mounted about an axis 26, and the molding surface 24 is curved about that axis. A motor 28 can rotate the housing to create high centrifugal forces urging slurry in the chamber against the molding surface 24.

During casting or molding of the tape 16, slurry from the source 14 passes through a valve 30 and through a stationary conduit 32 to a nozzle 34 which sprays the slurry against the molding surface 24. During such application of slurry, the housing 20 is rotated rapidly to create high centrifugal forces urging the slurry against the molding surface. The particles in the slurry are urged with great force against the molding surface 24 to achieve a high density of particles in the cast tape.

The slurry 12 includes solid particles, a binder which will bind the particles together, and a solvent which dissolves the binder and which has sufficient volume and sufficiently low viscosity to make the slurry easily flowable. In one example of a slurry for an oxygen membrane, the slurry includes zirconia oxide particles, an epoxy-type binder, and tolulene-ethynol solvent. The solvent is highly volatile. If the chamber 22 initially contained only air, and the slurry 12 were then cast onto the molding surface 24, there would likely be an uneven distribution of the slurry and the particles therein, and the particles might not be highly compacted. This is because the solvent would rapidly evaporate from the slurry, so that a low-viscosity slurry would not be present for sufficient time to be distributed evenly on the molding surface and for the particles to precipitate out of the surface and become highly packed.

Applicant closely controls the evaporation of the solvent in the slurry by including a container 36 having walls for containing extra solvent 38, and having a vapor-passing outlet 40 open to the inside of the chamber 22 against whose walls the slurry is cast. Prior to spraying the slurry onto the molding surface, applicant introduces solvent vapor into the chamber 22 at a partial pressure at least on the order of magnitude of the saturation pressure of the solvent at room temperature. This is accomplished by flowing solvent 42 from a source 44 through a stationary conduit 46 to a nozzle 48 which flows the solvent into the container 36. During the period of perhaps one minute required for passing solvent into the container 36 and for then rotating the chamber 22 up to full speed, sufficient solvent in the container will have evaporated to substantially saturate the area within the chamber with solvent vapor.

After the housing 20 has been rotated to full speed, the slurry from the source 14 is sprayed onto the molding surface 24 and a few seconds are allowed for the slurry to become evenly distributed and the particles to precipitate out of the slurry to a high packing density. With the housing continuing to rotate, the chamber 22 is vented to remove solvent vapors therefrom so as to allow substantially all of the liquid solvent in the cast slurry to evaporate. Applicant accomplishes this by operating a pump 50 to pump air from the atmosphere through the valve 30 which has been switched to allow air to be pumped through the conduit 32 into the chamber. At the same time, the source 44 is removed from the conduit 46 to allow air to escape from the chamber through the conduit 46 into the atmosphere (if a large amount of solvent is used, it may be recaptured, burned, or otherwise neutralized). The binder that is left in the cast slurry to bind the particles, may be in an air curing type which is cured after sufficient exposure to air, or may be a thermal curing type which is cured by heating the housing. The chamber continues to rotate while the binder cures. After the binder has cured, the housing 20 is disassembled, as by removing a cover 52 of the housing off a primary part 54 of the housing, to allow the tape 16 to be stripped off the molding surface 24 for later processing as by heating it in an oven.

In the particular apparatus shown in FIG. 1, a non-rotatable sealed plate 60 is rotatably mounted on rotatable seals 62 attached to the housing. A variety of constructions can be used, and a variety of methods can be used to initially seal the housing and then vent it of solvent vapors. In any case, the walls of the chamber 22 are constructed to form a substantially closed container so as to hold in the solvent vapors, and a means is provided to vent the chamber to remove solvent vapors while the molding surface continues to rotate.

In one process which applicant has carried out to mold the oxygen membrane described above which includes particles of zirconia oxide, an epoxy-type binder, and tolulene-ethynol solvent, applicant rotated the chamber at a speed which produced a centrifugal force about 2,000 times that of gravity against the molding surface 24. The slurry 12 was applied during a period of about 5 to 10 seconds, and a few additional seconds were left to allow the slurry to distribute. Venting was then accomplished, and the housing was allowed to continue to rotate for about 20 minutes while the binder cured. Applicant found that the particles achieved a density approaching the maximum theoretical packing density, and was much higher than had been achieved in the prior art by merely squeegeeing the slurry onto a flat surface. The thickness of the layer of particles and binder forming the tape was highly uniform. In the apparatus used by applicant, the molding surface 24 had a diameter of about 6 inches and a length of about 3 inches. Syringes were used as the sources of slurry and solvent. Laminated tapes can be constructed using additional slurry sources, with the slurries applied in sequence. If the solvent for a second slurry is different than for a first slurry, the solvent for the first slurry is preferably completely vented before the solvent for the next slurry is introduced.

Thus, the invention provides a method and apparatus for molding or casting a slurry containing particles in a solution, which enables the production of tapes with particles packed at high density and in a closely controlled manner to produce a uniform product. This is accomplished by applying the slurry to the walls of a rotating molding surface to allow centrifugal forces to pack the particles of the slurry to a high density. The slurry is maintained in a flowable state during the period it is flowed onto the molding surface and during the time required for the slurry to become evenly distributed and for the particles to precipitate out of the slurry, by maintaining the atmosphere immediately above the molding surface, in a closed chamber, and so it contains a high density of solvent vapor, the density preferably approaching that of saturation. After the slurry has been cast and evenly distributed and the particles precipitated out, the substantially sealed chamber is vented to allow the solvent in the slurry to evaporate, all which continuing to rotate the molding surface.

Although particular embodiments of the invention have been described and illustrated herein, it is recognized that modifications and variations may readily occur to those skilled in the art, and consequently, it is intended that the claims be interpreted to cover such modifications and equivalents.

What is claimed is:

1. A casting system comprising:
   a rotatably mounted molding housing forming a substantially closed chamber having an internal molding surface;
   means for rapidly rotating said housing to create centrifugal forces against said surface;
   means for applying a molding material, in the form of a slurry which includes multiple particles and a solvent containing a particle binder and evaporatable solvent, to said molding surface as said housing rotates;
   said housing including walls forming a container open to said chamber to permit the free passage of vapors therebetween, but with walls preventing the spillage of liquid from said container onto said moldings surface as the housing rotates, whereby to slow the evaporation of solvent from said molding material.

2. The system described in claim 1 including:
   means for venting solvent vapor from said closed container as it rapidly rotates.

3. Apparatus for molding a slurry containing particles in a solution, where the solution includes a solvent and a binder which can bind the particles into a sheet, to produce a heat containing particles bound together, comprising:
   walls forming a chamber having an internal largely cylindrical moldng surface which is curved about an axis, said chamber being substantially closed;
   means rotating said chamber walls substantially about said axis of said surface to create centrifugal force thereon;
   means for introducing said solvent in vaporous form in said substantially closed chamber prior to applying slurry to said molding surface;
   means, separte from said means for introducing said solvent, or applying said slurry to said molding surface while said chamber remains substantially closed and said chamber walls rotate, to prevent the escape of vaporous solvent; and
   means for venting said chamber to remove solvent therefrom.

4. The apparatus described in claim 3 including:
   a container having walls for containing liquid, and having a vapor-passing outlet coupled to said chamber while the chamber rotates, to allow solvent evaporating from said container to flow into said chamber against said molding surface.

5. Apparatus for molding a slurry containing particles in a solution, where the solution includes a solvent and a binder which can bind the particles into a sheet, to produce a sheet containing particles bound together, comprising:
   walls forming a chamber having an internal largely cylindrical molding surface which is curved about an axis;
   means for rotating said chamber walls substantially about said axis of said surface to create centrifugal forces thereon;

means for introducing said solvent in vaporous form in said chamber prior to applying slurry to said molding surface including a container having walls for containing liquid, and having a vapor-passing outlet coupled to chamber while the chamber rotates, to allow solvent evaporating from said container to flow into said chamber against said molding surface;

said chamber having opposite ends spaced along said axis and said container fixed to one end of said chamber to rotate with it, said container having an opening open to said chamber;

means for applying said slurry to said molding surface while said chamber walls rotate;

said chamber being substantially closed to the uncontrolled loss of solvent; and means for venting said chamber to remove solvent therefrom.

6. A method for casting a slurry containing particles in a solution of a solvent and a binder, comprising:

applying solvent vapor to said chamber prior to casting said slurry to avoid premature drying of the initial applied slurry;

applying said slurry to a largely cylindrical internal surface of a chamber while rotating said surface and sealing the chamber against the rapid loss of solvent therefrom, to thereby pack the particles densely against the cylindrical surface;

said step of applying solvent vapor including applying liquid solvent to a container which is open to the passage of vapors therefrom to said chamber, while largely sealing said chamber against the rapid loss of vaporous solvent, to fill said chamber with solvent vapor, and after said step of applying slurry, venting said solvent from said chamber to enable evaporation of said solvent, while continuing to rotate said surface, whereby to gradually allow the binder to bind closely packed particles.

* * * * *